United States Patent [19]
Holt

[11] Patent Number: 5,153,891
[45] Date of Patent: Oct. 6, 1992

[54] COPPER VAPOR LASERS

[75] Inventor: John Holt, New Brighton, Great Britain

[73] Assignee: British Nuclear Fuels plc, Risley, United Kingdom

[21] Appl. No.: 747,661

[22] Filed: Aug. 20, 1991

[30] Foreign Application Priority Data

Aug. 22, 1990 [GB] United Kingdom ............. 9018421

[51] Int. Cl.⁵ .................... H01S 3/22; H01S 3/223
[52] U.S. Cl. .................................................... 372/56
[58] Field of Search ........................................ 372/56

[56] References Cited

U.S. PATENT DOCUMENTS

| | | | |
|---|---|---|---|
| 3,585,524 | 6/1971 | Silfvast | 372/56 |
| 3,755,756 | 8/1973 | Silfvast | 372/56 |
| 3,891,943 | 6/1975 | Dowley et al. | 372/56 |
| 3,906,398 | 9/1975 | Low et al. | 372/56 |
| 4,441,189 | 4/1984 | Macklin et al. | 372/56 |
| 4,815,091 | 3/1989 | Hara et al. | 372/56 |
| 4,821,280 | 4/1989 | Kawase | 372/56 |
| 4,835,793 | 5/1989 | Mizuhara | 372/56 |
| 4,905,248 | 2/1990 | Nishida | 372/56 |
| 4,945,545 | 7/1990 | Piper | 372/56 |
| 4,955,033 | 9/1990 | Maitland et al. | 372/56 |
| 4,961,199 | 10/1990 | Duncan et al. | 372/56 |
| 4,991,180 | 2/1991 | Yamaguchi | 372/56 |

Primary Examiner—John D. Lee
Assistant Examiner—Robert E. Wise
Attorney, Agent, or Firm—William R. Hinds

[57] ABSTRACT

In a copper vapor laser, individual copper loads are each placed in a respective ceramic crucible and the crucibles are spaced apart at intervals along the length of the laser discharge tube.

6 Claims, 1 Drawing Sheet

COPPER VAPOR LASERS

The present invention concerns lasers.

A copper vapour laser requires the copper load to be located at discrete intervals along the interior of the ceramic tube of the laser. During operation of the laser the amount of copper at each position along the tube decreases with a resulting reduction in surface area of the copper. The surface area of the copper is related to the light output and electrical load of the laser. A reduction in surface area results in a decrease in light output and electrical load. Further, an increase in the number of copper loads within the tube, that is bringing the loads in closer proximity, can result in the formation of an undesirable continuous run of copper along the tube.

Preferably, each ceramic crucible is contoured to match the curvature of the discharge tube.

The use of the crucibles ensures a substantially near constant area of copper to the process and therefore stabilises the light output, electrical load and vapour pressure in the tube. Additionally, the use of crucibles for containing the copper permits a larger number of copper loads to be placed in the laser tube with out the risk of forming a continuous copper run in the tube.

According to the present invention there is provided a copper vapour laser having a discharge tube containing a copper charge, in which the copper charge comprises a plurality of separate individual copper loads each placed in a respective ceramic crucible with the crucibles being deposited on the inner wall of the base of the discharge tube and spaced apart at intervals along the length of the discharge tube, discharge electrodes provided in the tube, and means for applying a discharge between the electrodes sufficient to melt and vaporize copper of the copper loads, the shape of the crucibles being such as to present during the process of melting and vaporizing the copper a substantially constant surface area of copper to the tube.

Also according to the present invention there is provided a method of providing copper vapor in a copper vapor laser which comprises providing in a discharge tube of the laser a plurality of separate individual copper loads each placed in a respective ceramic crucible, with the crucibles being deposited on the inner wall of the base of the discharge tube and spaced apart at intervals along the length of the discharge tube, and applying an electrical discharge between the electrodes of the tube to melt and vaporize the copper in the crucibles, wherein during the process of melting and vaporizing the copper a substantially constant surface area of copper is presented to the tube.

Preferably, each ceramic crucible is contoured to match the curvature of the discharge tube.

The use of the crucibles ensures a substantially near constant area of copper to the process and therefore stabilises the light output, electrical load and vapour pressure in the tube. Additionally, the use of crucibles for containing the copper permits a larger number of copper loads to be placed in the laser tube without the risk of forming a continuous copper run in the tube. As a result the use of crucibles to contain the copper enables the light output of copper vapour lasers to be maintained at a substantially constant level for longer periods of time than hitherto.

To ensure adhesion of the copper to the walls of the crucible to form a pool rather than a bead it is preferable to roughen the interior of the crucible or a tungsten wire insert can be contained within the crucible.

The invention will be described further, by way of example, with reference to the accompanying drawings; in which.

Figure 1:
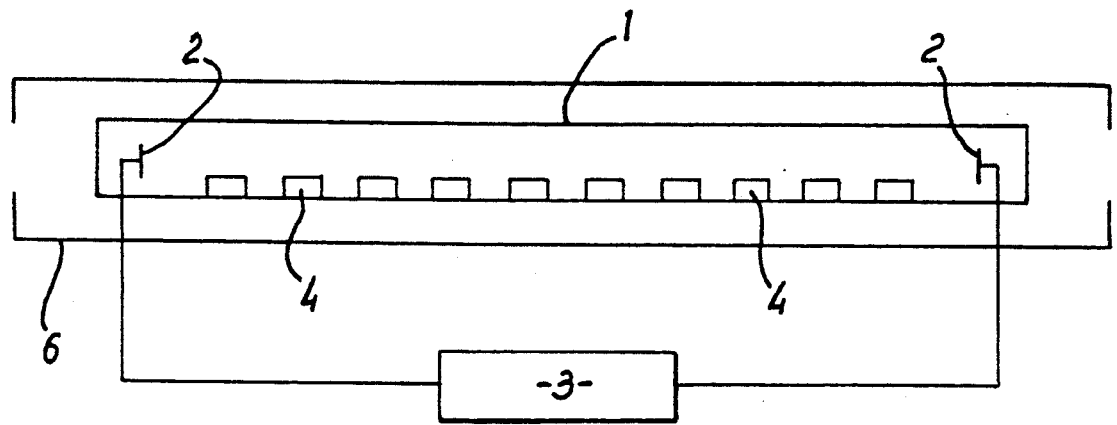
FIG. 1 is a schematic diagram of a laser head.
Figure 2:
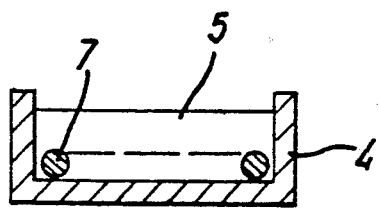
FIG. 2 is a diagrammatic section through a ceramic crucible for use in the laser head.

A laser head in FIG. 1 comprises a refractory ceramic tube 1 having electrodes 2 at opposite ends of the tube 1 connected to a power supply 3 capable of effecting high frequency pulsed electrical discharge between the electrodes. Ceramic crucibles 4 such as shown in FIG. 2 are spaced apart along the length of the tube 1. Each crucible 4 contains copper metal 5. Conveniently, the base of the crucible 4 can be curved to match the curvature of the ceramic tube 1.

The ceramic tube 1 is positioned within an outer insulation jacket 6. The heat generated by the discharge between the electrodes raises the temperature to melt and vaporise the copper metal in the crucibles 4 and initiate laser action.

As shown in FIG. 2, a tungsten wire insert 7 can be located in the crucible 4. Such an insert assists in keeping the molten copper in contact with the wall of the crucible, that is the copper remains substantially in the form of a disc within the crucible and resists the tendency of the copper to form a bead within the crucible. Alternatively, the wall of the crucible can be roughened to assist in adhesion of the copper to the wall. In this way the surface area of the copper in the crucible remains substantially constant.

I claim:

1. A copper vapor laser having a discharge tube containing a copper charge, in which the copper charge comprises a plurality of separate individual copper loads each placed in a respective ceramic crucible with the crucibles being deposited on the inner wall of the base of the discharge tube and spaced apart at intervals along the length of the discharge tube, discharge electrodes provided in the tube, and means for applying a discharge between said electrodes sufficient to melt and vaporize copper of said copper loads, the shape of said crucibles being such as to present during the process of melting a vaporizing said copper a substantially constant surface area of copper to said tube.

2. A copper vapour laser according to claim 1 in which each crucible is contoured to match the curvature of the tube.

3. A copper vapour laser according to claim 1 in which each crucible contains means interior of the crucible to assist contact between the copper load and the wall of the crucible.

4. A copper vapour laser according to claim 3 and comprising a tungsten wire insert within the crucible to assist contact between the copper load and the wall of the crucible.

5. A method of providing copper vapour in a copper vapour laser which comprises providing in a discharge tube of the laser a plurality of separate individual copper loads each placed in a respective ceramic crucible, with the crucibles being deposited on the inner wall of the base of the discharge tube and spaced apart at intervals along the length of the discharge tube, and applying an electrical discharge between the electrodes of the tube to melt and vaporize the copper in the crucibles, wherein during the process of melting and vaporizing said copper a substantially constant surface area of copper is presented to said tube.

6. A copper vapour laser having a discharge tube containing a copper charge in which the copper charge comprises a plurality of separate individual copper loads each placed in a respective ceramic crucible with the crucibles being spaced apart at intervals along the length of the discharge tube, each crucible containing means to assist contact between the copper load and the wall of the crucible, said means comprising a tungsten wire insert within the crucible to assist contact between the copper load and the wall of the crucible.

* * * * *